March 12, 1946.  R. D. LEDWIN  2,396,277
TAIL WHEEL ASSEMBLY FOR AIRPLANES
Filed Aug. 18, 1943  2 Sheets-Sheet 2
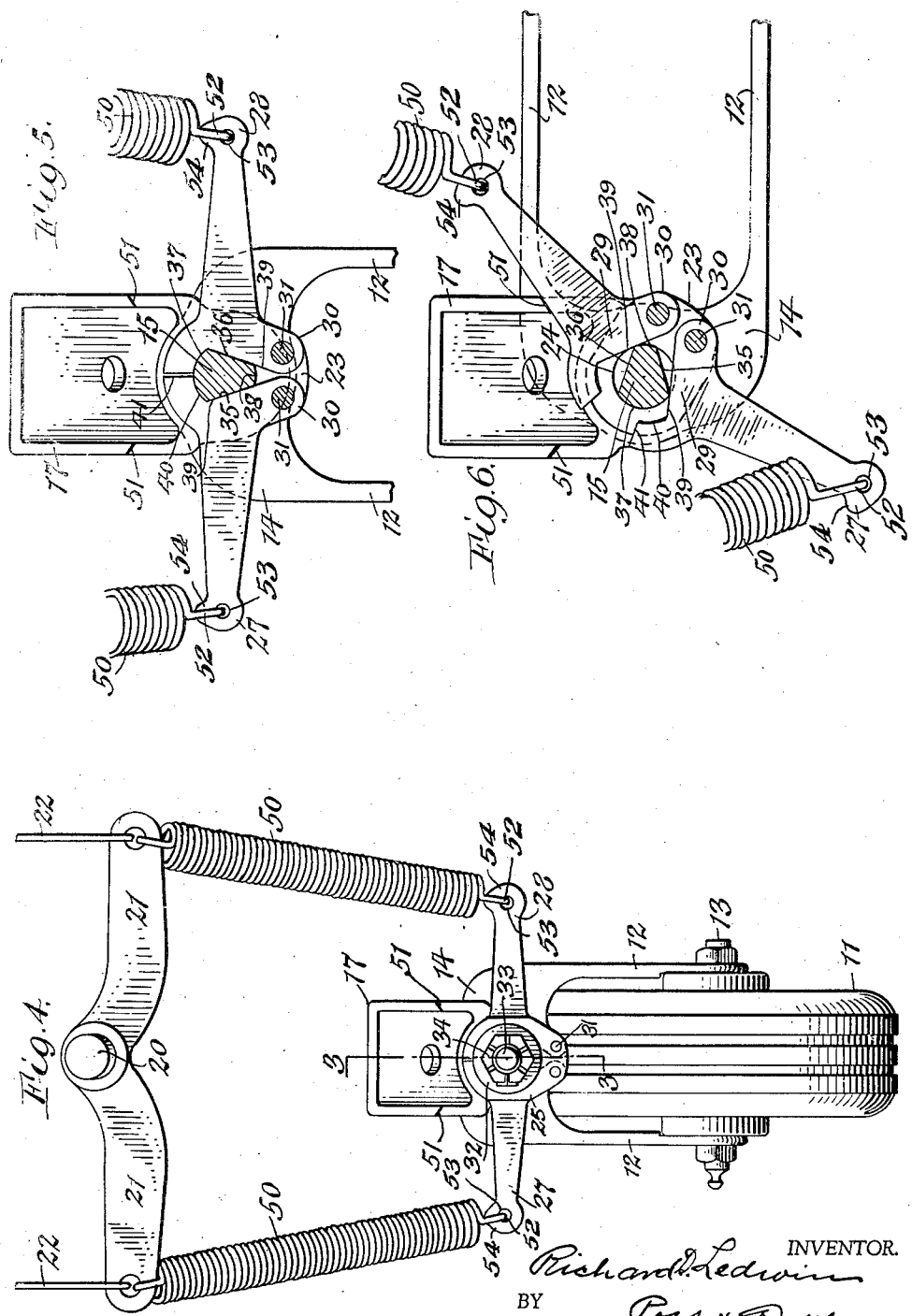
INVENTOR.
Richard D. Ledwin
BY
Popp & Popp
ATTORNEYS Patented Mar. 12, 1946

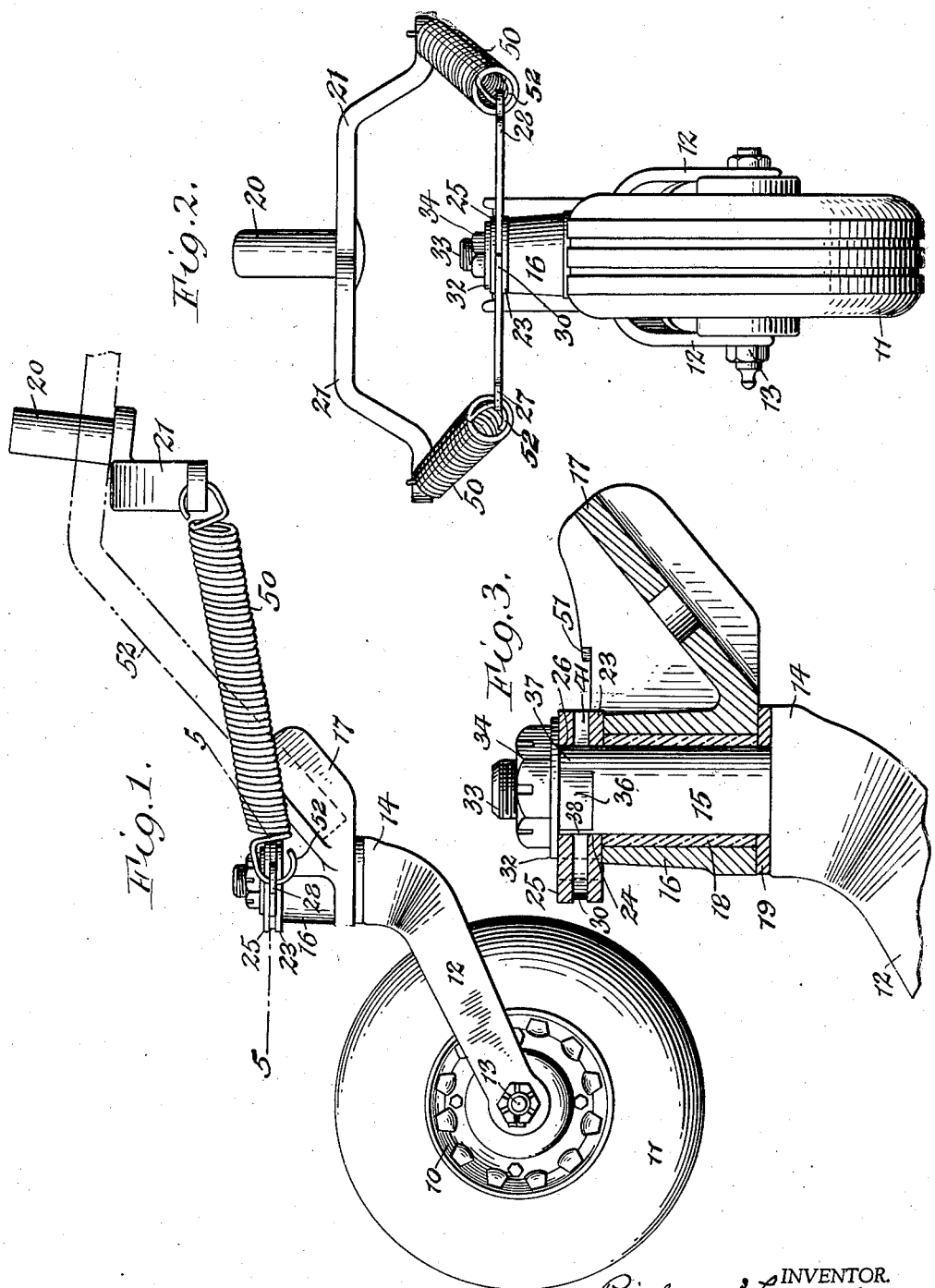

2,396,277

UNITED STATES PATENT OFFICE 2,396,277

TAIL WHEEL ASSEMBLY FOR AIRPLANES

Richard D. Ledwin, Eggertsville, N. Y., assignor to Scott Aviation Corporation, Lancaster, N. Y., a corporation of New York Application August 18, 1943, Serial No. 499,099

9 Claims. (Cl. 244—109)

This invention relates to a swivel wheel mounting which is more particularly intended for use in connection with a steerable tail wheel assembly for airplanes of the type which is adapted for use on light aircraft to obtain greater maneuverability thereof but may also be used advantageously in other installations.

Tail wheel assemblies of this character, as heretofore constructed, were too expensive to permit of their general adoption by the average light plane owner and the construction also was such that they would wear out unduly rapid and thus necessitate frequent replacement or repairing.

It is the purpose of this invention to provide a steerable tail wheel assembly which is more particularly intended for light airplanes, which is strong and durable and not liable to get out of order and which can be manufactured at relatively low cost and thus permit of its general use.

In the accompanying drawings:

Figure 1 is a side elevation of a steerable tail wheel assembly for airplanes embodying this invention.

Fig. 2 is a rear elevation of the same.

Fig. 3 is a fragmentary vertical section, on an enlarged scale, taken on line 3—3, Fig. 4.

Fig. 4 is a top plan view of the structure shown in Figs. 1 and 2.

Fig. 5 is a fragmentary horizontal section, on an enlarged scale, taken on line 5—5, Fig. 1, showing the tail wheel and associated parts in their central normal position in which the wheel supporting fork projects rearwardly from its axis.

Fig. 6 is a similar view showing the wheel supporting fork turned laterally at right angles to its rearwardly projecting central position and stopped in this position while the arms of the steering mechanism are in a position in which they are uncoupled from the axle or spindle of the wheel supporting fork.

In the following description similar reference numerals indicate like parts in the several figures of the drawings.

Referring to Figs. 1, 2 and 4, the numeral 10 represents the tail wheel which forms part of the steerable tail wheel assembly and which is usually provided on its periphery with a pneumatic tire 11 whereby the same rests on a supporting surface when the plane is not in flight. This wheel is arranged between the inclined branches 12 of a fork and pivoted thereto by means which include a horizontal axle 13. The head 14 at the upper ends of the fork branches is provided with an upright steering post 15 which is journaled in a bearing 16 at the rear end of a bracket or bearing block 17 which is mounted on the tail of the fuselage. The means for this purpose may be varied, but as shown in Fig. 1 the same consist of an inclined bar 52 which is connected at its rear end with the front part of the bracket while its front end may be connected in any suitable manner with the underside of the airplane tail.

In the preferred construction the bore of the bearing 16 is provided with a lubricating bushing 18 for the post 15 to turn in and a lubricating thrust washer 19 is interposed between the bracket and the fork head around the post to permit the wheel carrying fork to easily turn horizontally on the bracket.

The improved controlling means which embody this invention and whereby the steering fork and wheel are turned for normally steering the plane while on the ground are preferably operated in conjunction with the rudder mechanism whereby the aviator shifts the rudder of the airplane.

This rudder mechanism may be of any suitable construction but that shown in the drawings, by way of an example, comprises a vertical stud or rudder shaft 20 which is secured in the lower end of a tubular shaft on the rudder so as to turn therewith, two intermediate operating arms 21 projecting laterally from opposite sides of the rudder shaft, and to operating lines 22 extending forwardly from the operating arms and connected with opposite ends of a pedal or foot lever which is actuated by the aviator for steering the airplane.

The means which control the connection between the steering fork and the rudder controlling mechanism and which embody this invention are constructed as follows:

The numeral 23 represents a lower supporting plate having a circular bearing opening 24 which receives the lower part of the pivot post 15 and rests on the upper end of the fork bearing 16 and 25 is a similar plate which is spaced from this lower plate and has a circular bearing opening 26 which receives the upper part of this post. The two plates form parts of a bearing head for a purpose which will appear later. The numerals 27, 28 represent two steering arms or controlling members arranged on opposite sides of the axis of the steering fork and each provided at its end with a hub 29 which is arranged between the plates 23, 25 of the bearing head on one side of the steering post 15. The hubs of these steering arms are provided on their rear sides with rearwardly projecting pivot lugs 30 which are pivotally connected with the rear parts of the bearing plates 23, 25 by means of eccentric pivot pins or rivets 31 which are normally arranged on transversely opposite sides of the axis of the steering post 15 and also serve to connect the upper and lower bearing plates so as to compel them to turn in unison as a supporting head. The bearing plates and the hubs of the steering arms between them are held down relative to the upper side of the bracket bearing 16 and the head of the steering fork 14 is held up relative to the underside of the bracket bearing by means of a washer 32 surrounding a screw threaded stud or bolt 33 projecting upwardly from the steering post 15 and engaging the top of the upper bearing plate 25, and a screw nut 34 engaging with the top of the washer 32 and working on the thread of this bolt, as shown in Figs. 1–4.

On its upper part and horizontally in line with the hubs of the steering arms the steering post 15 is provided on its laterally opposite sides with flat cam faces 35, 36 which normally converge rearwardly and form a rearwardly tapering cam, the wide front end of which has a long curved face 37 and the narrow rear end of which has a short curved face 38, said curved faces being concentric with the axis of the steering post, as shown in Figs. 5 and 6. The cam means thus formed on the post are of symmetrical V-shape and therefore operate the same upon turning the post in either direction. The outer ends of the steering arms may be connected with the rudder control means in any suitable manner, so that the steering wheel is turned in unison with the rudder by the aviator. This may be accomplished in any suitable manner, for example by means of two helical springs or block members 50 each of which connects the outer end of each steering arm with the outer end of the companion rudder controlling arm 21 on the corresponding side of the fuselage.

During the normal operation of the steering mechanism the steering arms turn in unison with the steering post, fork and wheel but under abnormal conditions the steering post, fork and wheel are turned a greater extent than the steering arms independently of the latter, at which times the forward turning movement of each steering arm is arrested by engaging a stop 51 which is preferably arranged on the corresponding side of the bracket 17.

The inner side of the hub of each of the steering arms is provided with a straight tangential face 39, a curved face 40 extending inwardly from the front end of this straight face and a radial face 41 extending forwardly from the inner end of this curved face. In the normal position of the parts of the steering mechanism, as shown in Fig. 5, the flat tangential faces of the steering arm heads engage the converging faces 35, 36 of the cam on the steering post, the curved faces 40 of these heads engage with the curved wide face 37 of this cam and the radial faces 41 of these heads engage each other or are near one another, the curved faces 37 of the cam and the curved faces 40 of the steering arm heads at this time being preferably concentric.

While the parts are in this position the steering mechanism is turned in unison with the rudder in either direction from their central position, within certain limits, and thus places the steering mechanism at this time under the control of the aviator while on the ground, this limit of the turning movement of the steering mechanism being determined by the stops 51 on the bracket.

When maneuvering the airplane on the ground the steering wheel and fork are liable to be turned an abnormal extent from the central position either by turning the fork and wheel manually or due to backing of the plane on the ground. When thus turning the steering fork and wheel in either direction to an abnormal extent from the central position, the turning of the rudder in the corresponding direction is arrested by engagement of the respective rudder operating arm with the stop 51 on the same side of the fuselage, as shown in Fig. 6, which figure also shows the steering fork and wheel turned independently of the rudder operating mechanism into an abnormal position in which the steering fork is arranged forty-five degrees out of its normal central position, in other words, perpendicular to the longitudinal centerline of the fuselage.

When the steering fork is thus turned an abnormal extent away from its central position, the cam on the steering post 15 operates automatically to uncouple the steering fork from the rudder operating mechanism due to engagement of one side of the narrow part of the cam with one of the steering arms and swinging the same laterally outward in one direction relative to the axis of the steering post and engagement of the opposite side of the wide part of the cam with the other steering arm and swinging the same laterally outward in the opposite direction relative to the axis of the steering post, as shown in Fig. 6.

Upon similarly turning the steering fork in the opposite direction from the central position the cam of the steering post likewise swings the steering arms laterally outward from the axis of the steering post. As a result of this action of this mechanism the steering wheel and fork are released from the rudder operating mechanism and may be turned freely independently of the same into any desired position that may be necessary for handling the airplane on the ground.

From the foregoing it will be clear that by the use of this invention the operator has complete control of the steering mechanism within a predetermined angular range of the steering wheel but when this predetermined range of movement of the steering wheel and fork is exceeded by some force acting on the airplane, such as locking the brake on one landing wheel which would cause the airplane to pivot around that particular wheel; or when ground handling the airplane by a ground crew pushing the airplane backwards and causing the steering fork and wheel to turn into an abnormal position in which the steering wheel will caster freely in whatever direction the plane is being moved. At such times the steering arms are spread into an open or separated position and are operatively disconnected from the steering fork and wheel and thus allow the same to swivel fully in either direction in response to any pressures which are applied to the steering fork and wheel after one or the other of the steering arms has been arrested in its movement by engagement with the respective stop on the bracket 17.

Whenever the steering fork is turned backwardly from an abnormal position and the flat sides of the cam on the steering post are opposite the tangential faces 38 of the heads of the steering arms, then the forward pull or tension on the latter will reengage the steering arms with these faces of the cam and thereby restore the operative connection between the steering arms and the fork and place the latter under the control of the aviator pedal or foot lever.

When the steering fork is uncoupled from the manually operated steering mechanism the steering fork and wheel are free to swivel fully within predetermined limits and during this time the only control which the pilot has over the conduct of the airplane is through the brakes on the landing wheels, but the instant the steering fork is returned from an abnormal position to a position within the normal range of the steering fork, then the latter is automatically coupled with the steering mechanism and the steering of the airplane is again placed under the control of the pilot.

It has been found that due to the constant forward pull of the shock members or springs 50 the hooks 52 at the rear ends thereof which engage eyes or openings 53 in the outer ends of the steering or control arms cause these openings to wear or elongate forwardly into the form of slots which break through the front side of these arms and thus require unduly frequent renewal of these arms. In order to prolong the life of these arms and prolong the period of renewal, each of these arms is provided on its front side in line with the respective connecting opening 53 with a reinforcement 54 integral with the respective arm and having preferably the form of a teardrop which reinforces or widens this part of the steering arm and thus prolongs the time before there is any liability of this eye being torn out and thereby maintains the airplane to remain in serviceable condition for a greater length of time before replacement of the steering arms becomes necessary.

As a whole this invention is very simple in construction and can be manufactured at low cost and thus permit of its general use on light airplanes. Moreover the same is compact in construction, not liable to get out of order and readily accessible for inspection, servicing and repairing.

I claim as my invention:

1. A swivel wheel assembly for airplanes comprising a bracket having a bearing, a fork having a wheel and also provided with a pivot post which turns in said bearing, a coupling head which is mounted on said post to turn concentrically relative thereto, steering arms adapted to be pulled forwardly and having their inner ends pivoted to opposite parts of said head and eccentrically relative to the axis of the post, and cam means arranged on said post and engaging with the inner parts of said arms.

2. A swivel wheel assembly for airplanes comprising a bracket having a bearing, a fork having a wheel and also provided with a pivot post which turns in said bearing, a coupling head which is mounted on said post to turn concentrically relative thereto and having upper and lower plates, steering arms adapted to be pulled forwardly and having their inner ends arranged between said plates and pivoted thereto eccentrically relative to the axis of said post, and cam means arranged on said post and engaging with the inner ends of said steering arms.

3. A swivel wheel assembly for airplanes comprising a bracket having a bearing, a fork having a wheel and also provided with a pivot post which turns in said bearing, a coupling head which is mounted on said post to turn concentrically relative thereto and having upper and lower plates, steering arms adapted to be pulled forwardly and having their inner ends arranged between said plates and pivoted thereto eccentrically relative to the axis of said post, and cam means consisting of cam faces arranged on opposite sides of the post and engaging, respectively, with the inner parts of said steering arms.

4. A swivel wheel assembly for airplanes comprising a bracket having a bearing, a fork having a wheel and also provided with a pivot post which turns in said bearing, a coupling head which is mounted on said post to turn concentrically relative thereto and having upper and lower plates, steering arms adapted to be pulled forwardly and having their inner ends arranged between said plates and pivoted thereto eccentrically relative to the axis of said post, and symmetrical cam means arranged on the post and engaging with the inner parts of the steering arms.

5. A swivel wheel assembly for airplanes comprising a bracket having a bearing, a fork having a wheel and also provided with a pivot post which turns in said bearing, a coupling head which is mounted on said post to turn concentrically relative thereto and having upper and lower plates, steering arms adapted to be pulled forwardly and having their inner ends arranged between said plates and pivoted thereto eccentrically relative to the axis of said post, and V-shaped cam means arranged on the post and engaging opposite sides thereof, respectively, with the inner parts of said steering arms.

6. A swivel wheel assembly for airplanes comprising a bracket having a bearing, a fork having a wheel and also provided with a pivot post which turns in said bearing, a coupling head which is mounted on said post to turn concentrically relative thereto, steering arms adapted to be pulled forwardly and having their inner ends pivoted to opposite parts of said head and eccentrically relative to the axis of the post, cam means arranged on said post and engaging with the inner parts of said arms, and stop means for limiting the forward movement of said steering arms and permitting said post to turn independently of said head.

7. A swivel wheel assembly for airplanes comprising a bracket having a bearing, a fork having a wheel and also provided with a pivot post which turns in said bearing, a coupling head which is mounted on said post to turn concentrically relative thereto, steering arms adapted to be pulled forwardly and having their inner ends pivoted to opposite parts of said head and eccentrically relative to the axis of the post, cam means arranged on said post and engaging with the inner parts of said arms, and stops arranged on said bracket and adapted to limit forward movement of said steering arms and permit said head to turn independently of said arms.

8. A swivel wheel assembly for airplanes and the like comprising a bearing block, a steering member having a wheel, a post rotatable in said block and connected with said steering member and provided with a cam surface, a control member pivoted on said block and adapted to cooperate with said cam surface for coupling and uncoupling said post and control member, and a relatively stationary stop adapted to be engaged by said control member for arresting the movement of the same while the post rotates independently of said control member.

9. A swivel wheel assembly for airplanes and the like comprising a bearing block, a post rotatable in said block and provided on its opposite sides with cam faces, a steering member connected with said post and having a wheel, two control members arranged on opposite sides of said post and pivoted to the bearing block and movable into and out of engagement from said cam faces, and stops arranged on said bearing block and adapted to be engaged by said control members for arresting the movement of the same while the post continues to turn independently of said control members for uncoupling the latter from said post.

RICHARD D. LEDWIN.